May 10, 1960
A. ANGEL
2,935,836
APPLE PICKER
Filed Aug. 20, 1958
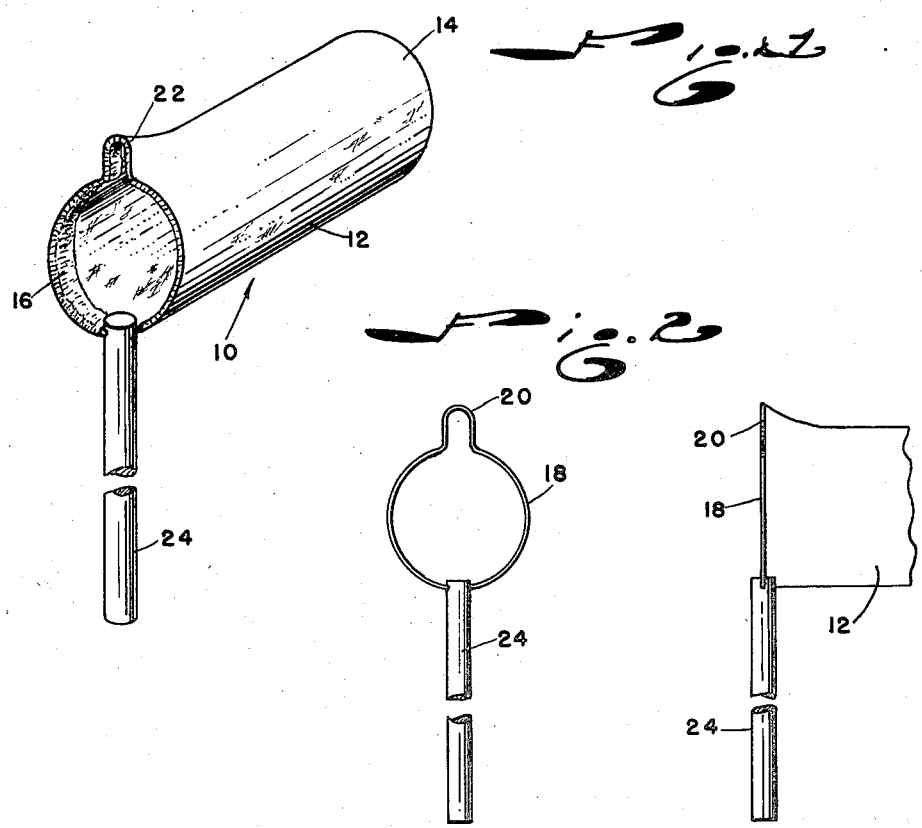
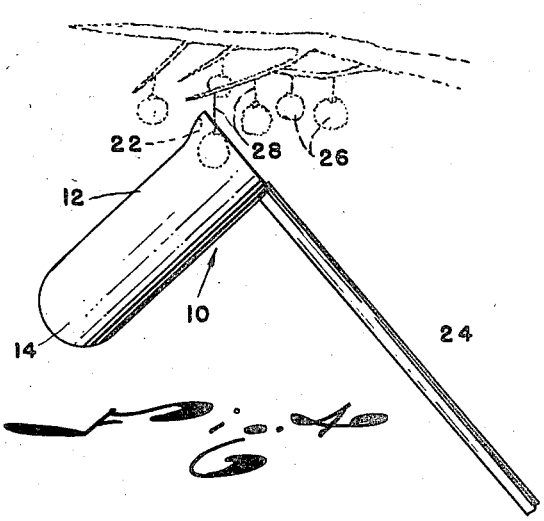
INVENTOR.
ANCIL ANGEL
BY
Joseph B. Lindecker
ATT'Y

United States Patent Office 2,935,836
Patented May 10, 1960

2,935,836

APPLE PICKER

Ancil Angel, South Irvine, Ky.

Application August 20, 1958, Serial No. 756,116

1 Claim. (Cl. 56—339)

This invention relates to farm equipment and more particularly to a device for gathering apples.

It is an object of the present invention to provide a manually operated apple picker that will effectively remove apples from trees without damaging the food in any way.

Another object of the present invention is to provide an apple picker of the above type that can be effectively manipulated from any position to gather apples located upon various parts of the tree in a simple and efficient manner.

Other objects of the invention are to provide an apple picker bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

Figure 1 is a fragmentary perspective view of an apple picker made in accordance with the present invention;

Figure 2 is a fragmentary plan view of a frame and handle forming a part of the present invention;

Figure 3 is a fragmentary side elevational view of the apparatus shown in Figure 2; and Figure 4 is a perspective view of an apple picker made in accordance with the present invention in operative use.

Referring now more in detail to the drawing, an apple picker 10 made in accordance with the present invention is shown to include an elongated substantially cplindrical sack 12 having a closed end 14 at one extremity and a seamed looped portion 16 at the opposite extremity defining an opening communicating with the interior of the sack 12. This seamed loop 16 slidably receives an endless wire frame 18 therethrough, which frame retains the shape of the sack 12 and the open end thereof. As is more clearly shown in Figures 1 and 2 of the drawing, the substantially cylindrical wire loop 18 is endless and includes a radial U-shaped extension 20 with parallel sides and a semi-circular closed end that defines a longitudinal channel 22 with parallel side walls within the sack which serve to grip the fruit as it is pulled downwardly from the tree, in a manner hereinafter more fully described.

An elongated shaft or cylindrical pole or handle 24 is integrally secured to the diametrically opposite sides of the frame 18 from the radial extension 20, whereby the open end of the sack may be readily manipulated from any position, said wire frame 18 extending through a transverse bore adjacent the upper end of said handle 24 and integrally secured thereto preventing any motion there between in any direction.

In actual use, the sack 12 is moved beneath the fruit 26 upon the tree in the manner illustrated in Figure 4. The constricted opening of the channel 22 is thus operative to frictionally engage the sides of the fruit 26 so positioned therewithin, that a downward pull upon the handle 24 is sufficient to tear the stem 28 without damaging the fruit, such fruit dropping into the interior of the sack 12 as they are freed from the tree. After the sack 12 has been partially or completely filled in this manner, the contents thereof are emptied into a packing container in a simple and efficient manner.

While various changes may be made in the detail construction, it shall be understood that such changes shall be within the spirit and scope of the present invention as defined by the appended claim.

What I claim as new and desire to protect by Letters Patent of the United States is:

An apple picker comprising, in combination, an elongated cylindrical pole having one transverse bore adjacent the upper end thereof and extending therethrough substantially perpendicular to the longitudinal axis thereof, one substantially circular shaped endless wire frame extending through said bore with the rear portion thereof integrally secured to said pole within said bore, the forward portion of said frame formed with a U-shaped extension having parallel sides and a semi-circular closed end portion, a substantially cylindrical elongated flexible sack closed at its bottom end, the top end of said sack formed with a seamed loop, said loop slidably receiving and enclosing said endless wire frame outside said post whereby it is attached thereto, and said seamed loop portion enclosing said U-shaped extension forming an elongated depending channel with parallel sides and a closed end portion for operatively engaging an apple on a tree to dislodge said apple therefrom by a downward pull upon said pole thereby allowing the apple to drop into said sack.

References Cited in the file of this patent

UNITED STATES PATENTS

| 595,034 | Beatty | Dec. 7, 1897 |
| 1,362,471 | Brockschmidt | Dec. 14, 1920 |
| 1,373,531 | Schultze | Apr. 5, 1921 |

OTHER REFERENCES

Popular Science, July 1944, page 191.